Patented June 29, 1954

2,682,508

UNITED STATES PATENT OFFICE 2,682,508

MINERAL OIL COMPOSITIONS OF SUPPRESSED FOAMING TENDENCY

Kenneth L. Godfrey, St. Albans, W. Va., assignor to Monsanto Chemical Company, St. Louis, Mo., a corporation of Delaware No Drawing. Application May 8, 1951, Serial No. 225,268

13 Claims. (Cl. 252—46.7)

This invention relates to new mineral oil compositions containing foam depressing agents.

Mineral oils have a tendency to foam or froth when agitated in the presence of gases, particularly when compounded as lubricating compositions. The additives found desirable for the proper functioning of the lubricant frequently enhance the tendency to foam. The amount and character of the foam varies with the composition and external conditions, in some instances being so severe as to seriously interfere with the use of the composition. For example under some conditions the volume of foam produced may be several times that of the original oil composition.

The esters of phosphorus acids are recognized as a desirable class of additives in the compounding of lubricating oil compositions. They may serve as antioxidants, corrosion inhibitors, antiwear agents and extreme pressure agents and other functions. An unusually wide variety of esters of phosphorus acids have been suggested for various purposes. However, some of these esters enhance the foaming tendencies of the oil or interfere with the suppression of foam. The addition of various materials to suppress foaming tendencies is known but many otherwise efficient foam inhibitors fail to function in the presence of certain esters of phosphorus acids, particularly acid esters. Thus, the search for satisfactory foam inhibitors is complicated by the fact that the result in the blank oil does not mean that the same or even similar results will be obtained with a compounded oil. Furthermore, compounds which are ineffective in the blank oil may have useful foam suppressing properties in the final composition.

An object of this invention is to provide compositions of suppressed foaming characteristics.

Another object is to provide a composition comprising mineral oil and one or more alkaryl esters of phosphorus acids of suppressed foam characteristics.

A further object is to provide new anti-foaming agents effective when dispersed in small amounts into lubricants compounded with alkaryl esters of phosphorus acids. Still another object is to provide anti-foaming agents which are effective in the presence of halogen and sulfur compounds. Another object is to provide anti-foaming agents which may be added to a concentrate consisting either in an admixture of additives including an alkaryl ester of a phosphorus acid or a concentrated oil solution and the normal foaming properties of the mineral oil lubricants compounded from the concentrate thereby reduced.

Other and further objects will be apparent from the detailed description and explanation following.

In accordance with this invention it has been discovered that amides of lower aliphatic carboxylic acids are effective for suppressing the foaming of mineral oil compositions containing alkaryl esters of phosphorus acids. By lower aliphatic carboxylic acids are meant acids containing from one to four carbon atoms or in other words formic through butyric acids. The amide group may be unsubstituted or substituted by one or more alkyl groups, as for example methyl, ethyl, isopropyl or butyl groups. Very small amounts based on the total composition are sufficient in most cases. Thus, the general useful range is from 0.001% to 1.0% and usually amounts within the range of 0.005 to 0.05% are preferred.

Phosphorus esters in which the ester forming constituent comprises at least one alkylated aryl group and especially the acid esters have been found to interfere with the foam suppressing properties of many otherwise efficient inhibitors. This type additive is often used in compounding heavy duty gear oil lubricants and the amides of this invention are especially adapted for use in conjunction with the alkaryl acid esters of phosphorus. Examples of phosphorus ester additives are ortho-n-butyl phenyl phosphate, and phosphite, ortho-tert. butyl phenyl phosphate and phosphite, 2,4-di-tert. butyl phenyl phosphate and phosphite, ortho-isoamyl phenyl phosphate and phosphite, ortho-tert. amyl phenyl phosphate and phosphite, 2,4,6-tri-tert. butyl phenyl phosphate, 2,6-di-tert. butyl-4-methyl phenyl phosphate, hexylphenylphosphate, heptylphenylphosphate, octylphenylphosphate, dodecylphenylphosphate and dioctylphenylphosphate. The mixture of acid esters obtained by reaction of $P_2O_5$ and an alkylated phenol may be used to advantage.

The relative effectiveness of the amides of lower carboxylic acids in preventing foaming of mineral oil compositions may be demonstrated by a test in which the composition is aerated under controlled conditions. In this test an approximately 190 ml. sample of the oil composition is placed in a 1000 ml. graduated cylinder containing a diffuser stone of such size that the oil level rises to the 200 ml. mark and air in the form of fine bubbles is passed upwardly through the column of the composition. The air is blown through the diffuser for 5 minutes at the rate of 0.2 cubic foot per hour. The air is then shut off and the volume of foam recorded. After an interval of 10 minutes, the volume of foam is again recorded. If the foam collapses to zero before the expiration of 10 minutes, the actual time required for complete disappearance of foam is noted.

As illustrative of the invention heavy duty gear oil lubricating compositions were compounded from an S. A. E. 30 Pennsylvania grade base as follows:

| Composition | A | B | C | D | E |
|---|---|---|---|---|---|
| Base oil_____parts by weight__ | 100 | 100 | 100 | 100 | 100 |
| Reaction product of chlorinated kerosene and potassium isopropyl xanthate parts by weight__ | 5 | 5 | 5 | 5 | -------- |
| Dihydroabietyl maleate_____do____ | 1 | -------- | 1 | 1 | -------- |
| Reaction product of di-tert. amylphenol and P₂O₅_____parts by weight__ | 0.5 | 0.5 | -------- | -------- | 0.37 |
| Reaction product of mono-tert. octylphenol and P₂O₅_____parts by weight__ | -------- | -------- | 0.5 | -------- | -------- |
| Reaction product of mono nonylphenol and P₂O₅_____parts by weight__ | -------- | -------- | -------- | 0.5 | -------- |
| Chlorinated wax_____do____ | -------- | -------- | -------- | -------- | 4.5 |
| Sulfurized terpene_____do____ | -------- | -------- | -------- | -------- | 1.2 |

The foaming characteristics of the compositions so prepared were determined by the method described and compared to those of the same compositions containing a small amount of dimethyl formamide.

| Composition | Inhibitor, Parts by Weight | Foaming Initial Reading, ml. | Ml. after 10 minutes or time to collapse to zero |
|---|---|---|---|
| A | none | 600 | 200. |
| A | 0.02 | 135 | 5 min. |
| B | none | 605 | 350. |
| B | 0.01 | 30 | 20 sec. |
| C | none | 485 | 50. |
| C | 0.02 | 52 | 6 min. |
| D | none | 460 | 15. |
| D | 0.02 | 32 | 2 min. |
| E | none | 530 | 25. |
| E | 0.02 | 52 | 35 sec. |

It will be noted that the presence of a small amount of dimethyl formamide markedly reduced the foaming and that the small volume of foam which was formed disappeared within ten minutes. Acetamide, formamide and dimethyl acetamide were tested under similar conditions and found to be efficient foam inhibitors. Excellent results have been obtained with inhibitors of the structure

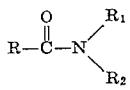

where R, R₁ and R₂ are selected from hydrogen and alkyl groups less than four carbon atoms.

The foam suppressing amide may be added to the alkaryl phosphorus ester additive, to an admixture of the ester and other compounding agents for mineral oil lubricants, to a concentrated acid solution of one or more mineral oil adjuvants or to the compounded lubricant. For example it is convenient to add the amide to the admixtures described above as compositions A, B, C, D and E but omitting the base oil. From such concentrates mineral oil lubricants of decreased foaming tendencies are readily produced.

What is claimed is:

1. A mineral lubricating oil composition comprising a major proportion of a hydrocarbon oil containing a small amount of an alkaryl phosphorus ester additive and an amide of a lower aliphatic carboxylic acid in small amount sufficient to decrease the normal foaming properties of the composition.

2. A mineral lubricating oil composition comprising a major proportion of a hydrocarbon oil containing a small amount of an acid alkaryl phosphate and an amide of an aliphatic carboxylic acid containing less than five carbon atoms in small amount sufficient to decrease the normal foaming properties of the composition.

3. A mineral lubricating oil composition comprising a major proportion of a hydrocarbon oil containing a small amount of an acid alkaryl phosphate and dimethyl formamide in small amount sufficient to decrease the normal foaming properties of the composition.

4. A mineral lubricating oil composition comprising a major proportion of a hydrocarbon oil containing a small amount of an acid alkaryl phosphate and dimethyl acetamide in small amount sufficient to decrease the normal foaming properties of the composition.

5. A mineral lubricating oil composition comprising a major proportion of a hydrocarbon oil containing a small amount of an acid alkaryl phosphate and acetamide in small amount sufficient to decrease the normal foaming properties of the composition.

6. A mineral lubricating oil composition comprising a major proportion of a hydrocarbon oil containing a small amount of diamylphenyl acid phosphate and dimethyl formamide in small amount sufficient to decrease the normal foaming properties of the composition.

7. A mineral lubricating oil composition comprising a major proportion of a hydrocarbon oil containing a small amount of monooctylphenyl acid phosphate and dimethyl formamide in small amount sufficient to decrease the normal foaming properties of the composition.

8. A mineral lubricating oil composition comprising a major proportion of a hydrocarbon oil containing a small amount of mononoylphenyl acid phosphate and dimethyl formamide in small amount sufficient to decrease the normal foaming properties of the composition.

9. A mineral lubricating oil composition comprising a major proportion of a hydrocarbon oil containing a small amount of dibutylphenyl acid phosphate and dimethyl formamide in small amount sufficient to decrease the normal foaming properties of the composition.

10. A mineral lubricating oil composition comprising a major proportion of a hydrocarbon oil, minor proportion of an organic E. P. additive containing both halogen and sulfur, a minor proportion of an alkaryl acid phosphate containing at least 4 carbon atoms in the side chain and a small amount of an amide of a lower aliphatic carboxylic acid sufficient to decrease the normal foaming properties of the composition.

11. A mineral lubricating oil composition comprising a major proportion of a hydrocarbon oil containing minor proportions of E. P. additives having in chemical combination sulfur and chlorine, a minor proportion of an alkaryl acid phosphate containing at least 4 carbon atoms in the side chain and a small amount sufficient to decrease the normal foaming properties of the composition of an amide of the structure

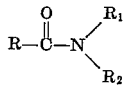

where R, R₁ and R₂ are selected from hydrogen and alkyl groups of less than 4 carbon atoms.

12. A mineral lubricating oil composition comprising a major proportion of a hydrocarbon oil containing a small amount of an acid alkaryl phosphate and a small amount of formamide sufficient to decrease the normal foaming properties of the composition.

13. A composition for compounding mineral hydrocarbon oil lubricants of suppressed foaming character comprising a major proportion of E. P. additives having in chemical combination sulfur and chlorine, a minor proportion of an alkaryl acid phosphate containing at least 4 carbon atoms in the side chain and a small amount sufficient to decrease the normal foaming tendencies of the compounded mineral hydrocarbon oil of an amide of the structure

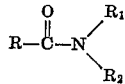

where R, R₁ and R₂ are selected from hydrogen and alkyl groups of less than 4 carbon atoms.

No references cited.